US010771641B2

(12) United States Patent
Kusano et al.

(10) Patent No.: US 10,771,641 B2
(45) Date of Patent: Sep. 8, 2020

(54) INFORMATION PROCESSING DEVICE AND NON-TRANSITORY COMPUTER READABLE MEDIUM

(71) Applicant: FUJI XEROX CO., LTD., Tokyo (JP)

(72) Inventors: Nobumi Kusano, Kanagawa (JP); Ichiro Shiozaki, Kanagawa (JP); Tadao Michimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 301 days.

(21) Appl. No.: 15/581,605

(22) Filed: Apr. 28, 2017

(65) Prior Publication Data
US 2018/0173408 A1 Jun. 21, 2018

(30) Foreign Application Priority Data

Dec. 20, 2016 (JP) .................................. 2016-246155

(51) Int. Cl.
G06F 3/00 (2006.01)
H04N 1/00 (2006.01)
(52) U.S. Cl.
CPC ..... H04N 1/00413 (2013.01); H04N 1/00411 (2013.01); H04N 1/00 (2013.01); H04N 2201/0094 (2013.01)

(58) Field of Classification Search
None
See application file for complete search history.

(56) References Cited

U.S. PATENT DOCUMENTS

| 2006/0089193 | A1* | 4/2006 | Buecheler | G07F 17/3239 463/23 |
| 2011/0231800 | A1 | 9/2011 | Tomita et al. | |
| 2012/0008158 | A1 | 1/2012 | Tani et al. | |
| 2014/0032584 | A1* | 1/2014 | Baker | G06F 3/04886 707/758 |
| 2015/0046879 | A1* | 2/2015 | Orimoto | G06K 15/005 715/835 |

(Continued)

FOREIGN PATENT DOCUMENTS

| JP | 2002-296981 A | 10/2002 |
| JP | 2011-193405 A | 9/2011 |
| JP | 2012-018601 A | 1/2012 |

(Continued)

OTHER PUBLICATIONS

Hye-Rin Kim et al., Multi Color Selection using Color Database, Jul. 1, 2013, IEEE Computer Society, pp. 26-29 (Year: 2013).*

(Continued)

Primary Examiner — Tam T Tran
(74) Attorney, Agent, or Firm — Oliff PLC

(57) ABSTRACT

An information processing device includes a creating unit, a state informing unit, and a setting unit. The creating unit creates an application for implementing a specific object by using at least one basic processing function. The state informing unit provides information concerning a processing state of the at least one basic processing function and a processing state of the application. The setting unit receives information for determining a display mode of a setting screen for setting settings information or a checking screen for checking the processing state of the application, and sets a determined display mode. The display mode is used for executing the application.

12 Claims, 18 Drawing Sheets

(56) References Cited

U.S. PATENT DOCUMENTS

| | | | |
|---|---|---|---|
| 2017/0109142 A1* | 4/2017 | Kaushal | G06F 8/34 |
| 2018/0315491 A1* | 11/2018 | Filipovich | G16H 10/40 |

FOREIGN PATENT DOCUMENTS

| | | |
|---|---|---|
| JP | 2013-254290 A | 12/2013 |
| JP | 2015-144017 A | 8/2015 |

OTHER PUBLICATIONS

Lina Zhou et al., Color Adaptation for Improving Mobile Web Accessibility, Jun. 1, 2014, IEEE (Year: 2014).*

Riva Aktivia et al., Visual Usability Design for Mobile Application Based on User Personality, Oct. 1, 2014, ICACSIS 2014, pp. 1-6 (Year: 2014).*

Lina Zhou et al., Color Adaptation for improving Mobile Web Accessibility, Jun. 1, 2014, IEEE, pp. 1-6 (Year: 2014).*

* cited by examiner

FIG. 9A

| COLOR SET ID | ICON | COLOR SET | | | | |
|---|---|---|---|---|---|---|
| | | MAIN (SINGLE COLOR) | MAIN (TEXTURE PATTERN) | SHADE | HIGHLIGHT COLOR | CHARACTER COLOR |
| | | | | | | |

905 — COLOR SET ID
910 — ICON
900 — (table)
917 — MAIN (SINGLE COLOR)
919 — MAIN (TEXTURE PATTERN)
915 — COLOR SET
921 — SHADE
923 — HIGHLIGHT COLOR
925 — CHARACTER COLOR

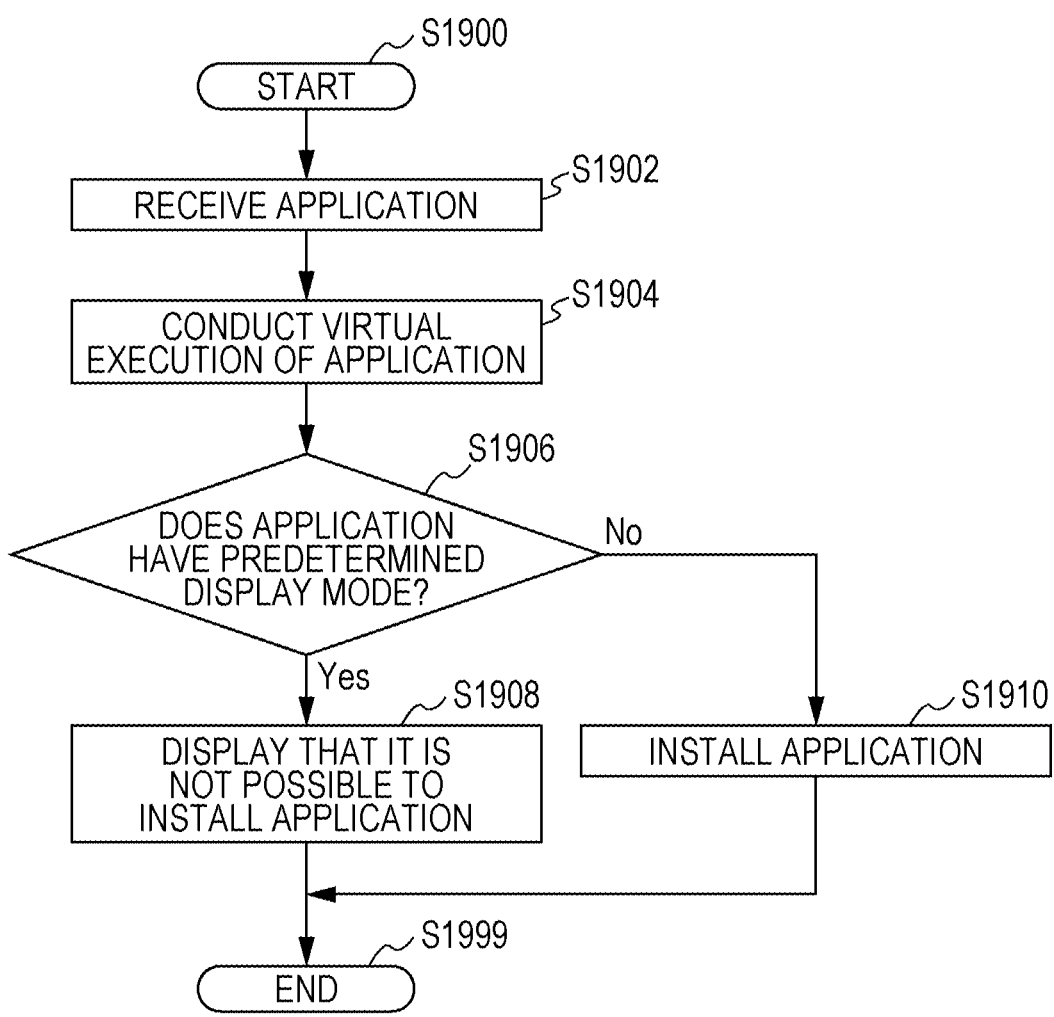

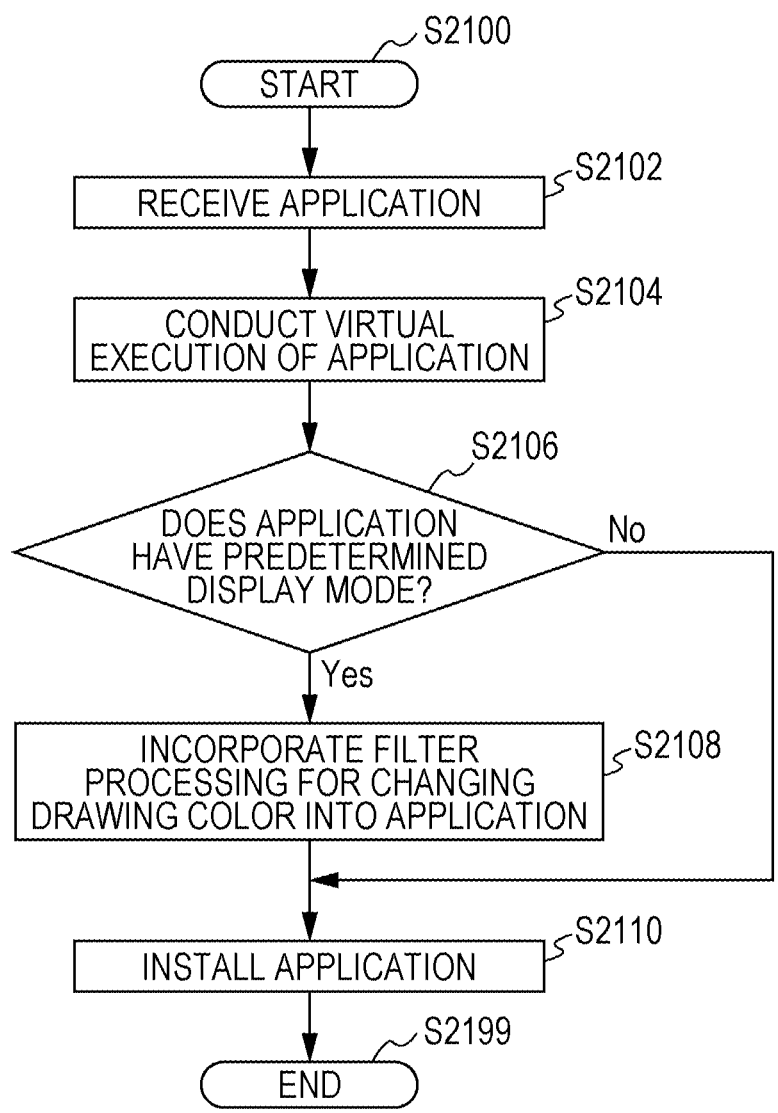

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-246155 filed Dec. 20, 2016.

BACKGROUND

Technical Field

The present invention relates to an information processing device and a non-transitory computer readable medium.

SUMMARY

According to an aspect of the invention, there is provided an information processing device including a creating unit, a state informing unit, and a setting unit. The creating unit creates an application for implementing a specific object by using at least one basic processing function. The state informing unit provides information concerning a processing state of the at least one basic processing function and a processing state of the application. The setting unit receives information for determining a display mode of a setting screen for setting settings information or a checking screen for checking the processing state of the application, and sets a determined display mode. The display mode is used for executing the application.

BRIEF DESCRIPTION OF THE DRAWINGS

An exemplary embodiment of the present invention will be described in detail based on the following figures, wherein:

FIG. 9A illustrates an example of the data structure of a color set table;

FIG. 19 is a flowchart illustrating an example of processing executed in the exemplary embodiment;

FIG. 21 is a flowchart illustrating an example of processing executed in the exemplary embodiment.

DETAILED DESCRIPTION

An exemplary embodiment of the invention will be described below with reference to the accompanying drawings.

Figure 1:
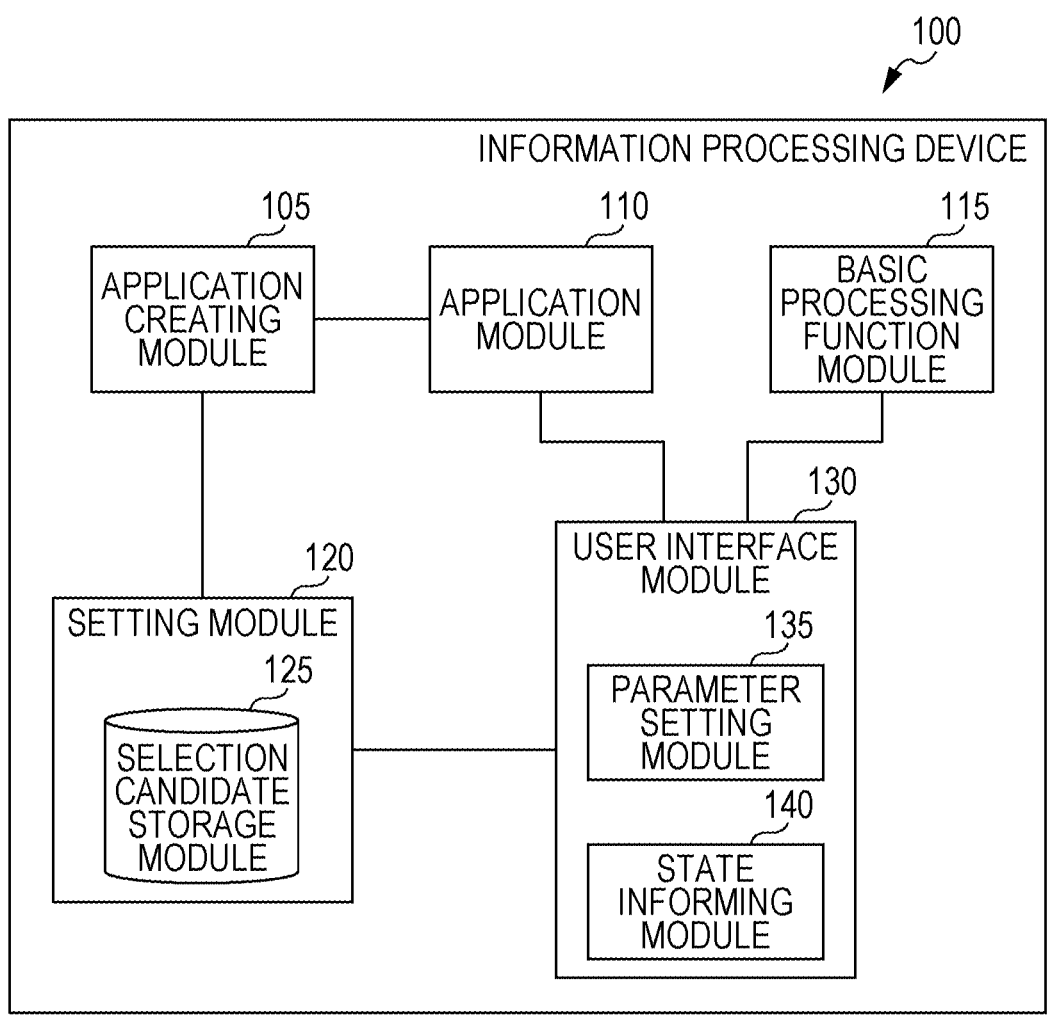
FIG. 1 is a block diagram of conceptual modules forming an example of the configuration of the exemplary embodiment.

FIG. 1 is a block diagram of conceptual modules forming an example of the configuration of the exemplary embodiment.

Generally, modules are software (computer programs) components or hardware components that can be logically separated from one another. The modules of the exemplary embodiment of the invention are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary.

A system or an apparatus may be implemented by connecting plural computers, hardware units, devices, etc., to one another via a communication medium, such as a network (including communication based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk (HD), a random access memory (RAM), an external storage medium, a storage device using a communication line, a register within a central processing unit (CPU), etc.

An information processing device 100 according to the exemplary embodiment creates a user interface for an application (also called an application program). As shown in FIG. 1, the information processing device 100 includes an application creating module 105, an application module 110, a basic processing function module 115, a setting module 120, and a user interface module 130.

The application creating module 105 is connected to the application module 110 and the setting module 120. The application creating module 105 creates an application for implementing a specific object by using one or more basic processing functions. Basic processing functions provided when the information processing device 100 is integrated into an image processing apparatus 200 are copying, fax sending, scanning, and printing. "Scanning" may include operations which accompany scanning, such as email sending and file sending of a scanned image, storing a scanned image in a storage unit (also called a box) of the image processing apparatus 200, and storing a scanned image in a file server, such as a server message block (SMB). An application created by using such a basic processing function may be an application created by setting predetermined parameters in a basic processing function or a workflow (may be a built-in application) formed by a combination of these basic processing functions. Each of these basic processing functions is also provided as an application. Typically, basic processing functions are already installed as applications in the information processing device 100 in the initial state (for example, when the information processing device 100 is shipped). However, basic processing functions are not necessarily installed as applications in the information processing device 100 in the initial state, and may be added after the information processing device 100 is shipped. Applications other than the basic processing functions are those added after the information processing device 100 is shipped. That is, in the initial state, no applications other than the basic processing functions are installed.

An example of applications other than the basic processing functions is a workflow which is created by using an application programming interface (API) for providing basic processing functions and which is then installed in the information processing device 100 (or the image processing apparatus 200).

More specifically, an application created by setting desired settings, such as the number of copies, color mode, and magnification factor, in a copying function, which is a basic processing function, or an application for providing a setting unit for setting desired settings (some parameters) to a copying function is an application. That is, an application created by setting desired settings in a basic processing function is included in an application created "by using one or more basic processing functions".

An application created by using an API, which is a basic processing function, provided by the image processing apparatus 200 (information processing device 100) is included in an application created "by using one or more basic processing functions". Examples of APIs are network interface APIs (APIs provided by a higher layer, such as SMB, file transfer protocol (FTP), and lightweight directory access protocol (LDAP), port OFF/ON settings, settings for connecting servers, and operation settings), self-diagnosis program APIs, and file input and output (IO) APIs.

The application module 110 is connected to the application creating module 105 and the user interface module 130. The application module 110 executes an application created by the application creating module 105.

The basic processing function module 115 is connected to the user interface module 130. The basic processing function module 115 executes basic processing functions in the information processing device 100. As discussed above, when the information processing device 100 is integrated into an image processing apparatus 200, the basic processing function module 115 performs copying, fax sending, scanning, and printing.

The setting module 120 includes a selection candidate storage module 125, and is connected to the application creating module 105 and the user interface module 130. The setting module 120 receives information for determining a display mode of a setting screen for setting settings information or a checking screen for checking the processing state, and sets the display mode. The display mode is used for executing an application. More specifically, the setting module 120 sets a display mode of a setting screen displayed by a parameter setting module 135 and a display mode of a checking screen displayed by a state informing module 140. Information for determining a display mode of a setting screen or a checking screen may be a color. The color may be a set of colors including multiple colors (hereinafter may also be called a color set). Multiple colors forming a set of colors may be used at least as a character color or a background color. Multiple colors may also be used as a highlight color and a shade color.

Examples of "the checking screen for checking the processing state" are as follows.

A screen for checking the content of processing to be executed (or the content of executed processing) by an information processing device, and more specifically, a screen for checking the execution status of a job.

A screen for executing processing in accordance with settings information and a screen for checking settings information set in an information processing device.

As described above, applications include a function of providing a setting screen and a checking screen.

When receiving information for determining a display mode of a screen for an application, the setting module 120 may present plural selection candidates. The plural selection candidates are those stored in the selection candidate storage module 125.

The setting module 120 may select some selection candidates from the plural selection candidates so as to restrict information for providing information concerning the processing state of an application by the state informing module 140, and present the restricted information. The information to be presented may be color information (color sets), as will be discussed later. The setting module 120 may present information so that a user can select one item of information. The setting module 120 may restrict information by presenting information so that the information will not overlap the display modes of setting screens and checking screens of basic processing functions and those of applications which have already been installed. In this case, the setting module 120 may exclude color information which has already been used. In this case, color information similar to such color information may also be excluded.

The setting module 120 may select some selection candidates from the plural selection candidates so as to restrict information used for a display mode of an application and present the restricted information. More specifically, the setting module 120 may restrict information by (1) performing control so that candidates will not be presented at all as selection options and (2) performing control so that candidates may be presented but cannot be selected. Information to be restricted (information not to be presented or information not to be selected) is an informing mode for a state of a function provided by the information processing device 100 in the initial state or an informing mode for a state of an application which has already been created. Restricting of information enables a user to distinguish an informing mode for a state of an application which will be or has been added later from an informing mode for a state of a function provided by the information processing device 100 in the initial state or an informing mode for a state of an application which has already been created.

The selection candidate storage module 125 stores plural items of information for determining a display mode of a screen for an application. The selection candidate storage module 125 stores a color set table 900, which will be discussed later with reference to FIG. 9A, for example.

The user interface module 130 includes a parameter setting module 135 and a state informing module 140. The user interface module 130 is connected to the application module 110, the basic processing function module 115, and the setting module 120. The user interface module 130 controls a display, such as a liquid crystal display, to display a setting screen or a checking screen. The display is provided in the information processing device 100. A setting screen or a checking screen may be output as three-dimensional (3D) video, or may be combined with sound or vibration by using a sound output unit such as a speaker.

The parameter setting module 135 receives parameter settings for basic processing functions and applications. The parameter setting module 135 displays a screen for receiving parameter settings on the display.

The state informing module 140 provides information concerning processing states of basic processing functions and applications, and displays processing states on the display. The processing states of basic processing functions include the state of the system for operating the image processing apparatus 200. In this case, it is necessary that a color set reserved by the system (color sets used for the processing states of the basic processing functions) be not selected as a color set for a display mode of an application by a user. When instructing a user to select a color set for an application, the setting module 120 excludes a color set used by a basic processing function related to system control (gray color set, for example), and presents other color sets.

Figure 2:
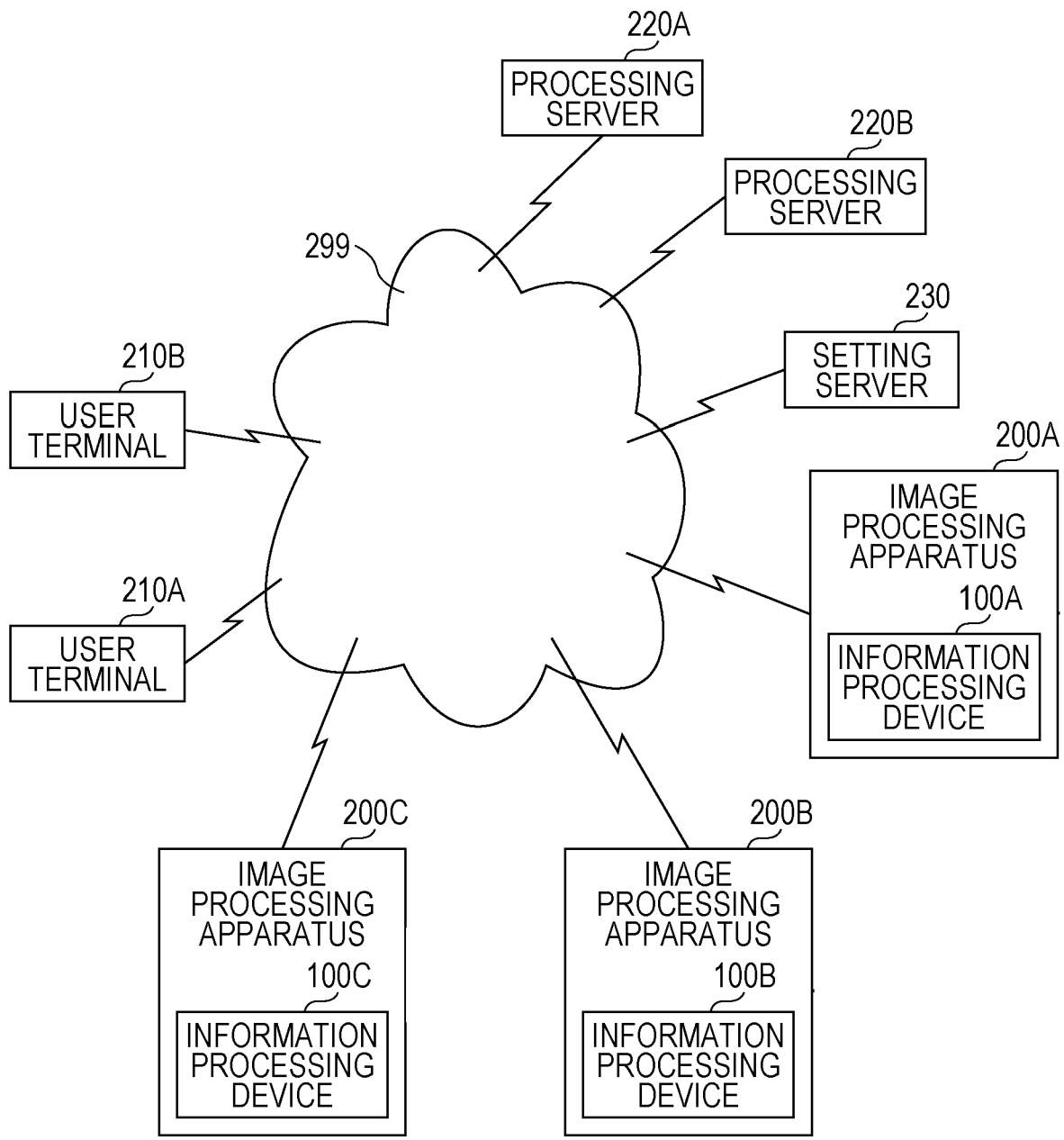
FIG. 2 is a block diagram illustrating an example of the configuration of a system utilizing the exemplary embodiment.

FIG. 2 is a block diagram illustrating an example of the configuration of a system utilizing the exemplary embodiment.

Image processing apparatuses 200A, 200B, and 200C, user terminals 210A and 210B, processing servers 220A and 220B, and a setting server 230 are connected to one another via a communication line 299. The communication line 299 may be a wireless or wired medium, or a combination thereof, and may be, for example, the Internet or an intranet as a communication infrastructure. Hereinafter, the image processing apparatuses 200A, 200B, and 200C will simply be called the image processing apparatus 200 or the image processing apparatuses 200 unless it is necessary to distinguish them from each other. Hereinafter, the user terminals 210A and 210B will simply be called the user terminal 210 or the user terminals 210 unless it is necessary to distinguish them from each other. Hereinafter, the processing servers 220A and 220B will simply be called the processing server 220 or the processing servers 220 unless it is necessary to distinguish them from each other. The functions of the processing server 220 may be implemented as cloud services. The image processing apparatuses 200A, 200B, and 200C respectively include information processing devices 100A, 100B, and 100C. The image processing apparatus 200 is a copying machine, a fax machine, a scanner, a printer, or a multifunction device (image processing apparatus having two or more functions of a scanner, a printer, a copying machine, and a fax machine), for example. The image processing apparatus 200 is operated directly by a user or receives a user operation performed on the user terminal 210. The operation performed on the image processing apparatus 200 or on the user terminal 210 is an operation for executing an application provided by the image processing apparatus 200 or another application in order to execute the above-described basic processing function. "Another application" may be created by the image processing apparatus 200 or may be created by an external device such as the user terminal 210 or the setting server 230 and be received by the image processing apparatus 200. Some basic processing functions are provided as applications. Some basic processing functions are not provided as applications, and a basic processing function related to network connection is an example of such basic processing functions.

The image processing apparatus 200 may execute processing in response to a user operation or may request the processing server 220 to execute processing (character recognition processing, for example) and receive a processing result. The image processing apparatus 200 may set an informing mode in response to a user operation or in response to an instruction from the setting server 230. The setting server 230 provides instructions to the plural image processing apparatuses 200, so that informing modes can be set consistently in the plural image processing apparatuses 200.

Figure 3:
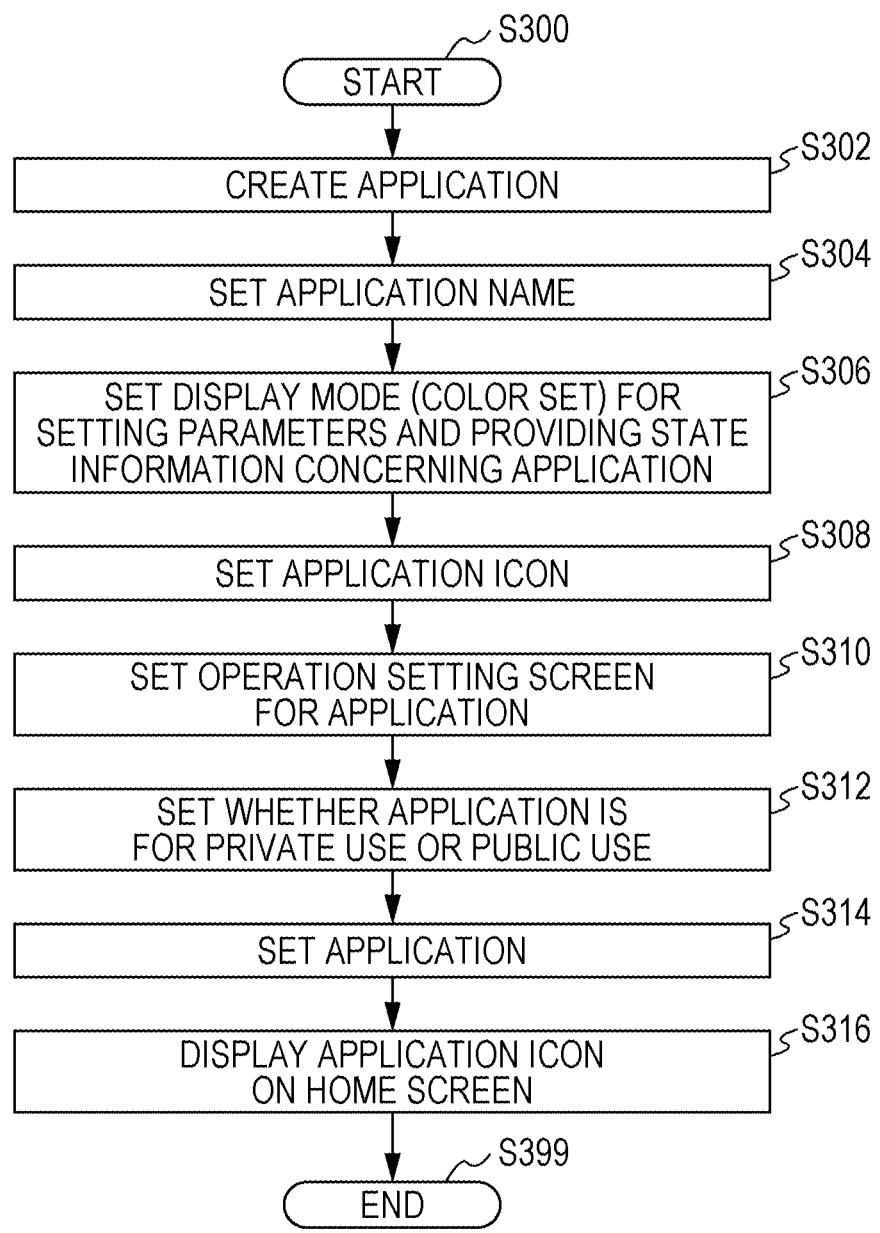
FIG. 3 is a flowchart illustrating an example of processing executed in the exemplary embodiment.

FIG. 3 is a flowchart illustrating an example of processing executed in the exemplary embodiment.

In step S302, an application is created. An application may be created by the image processing apparatus 200 or may be created by an external device, such as a user terminal 210, and be received by the image processing apparatus 200. An application created by an external device may be received via a communication line or be read from a medium, such as a universal serial bus (USB) memory. A specific processing example of step S302 will be described below with reference to FIGS. 4 through 6.

Figure 4:
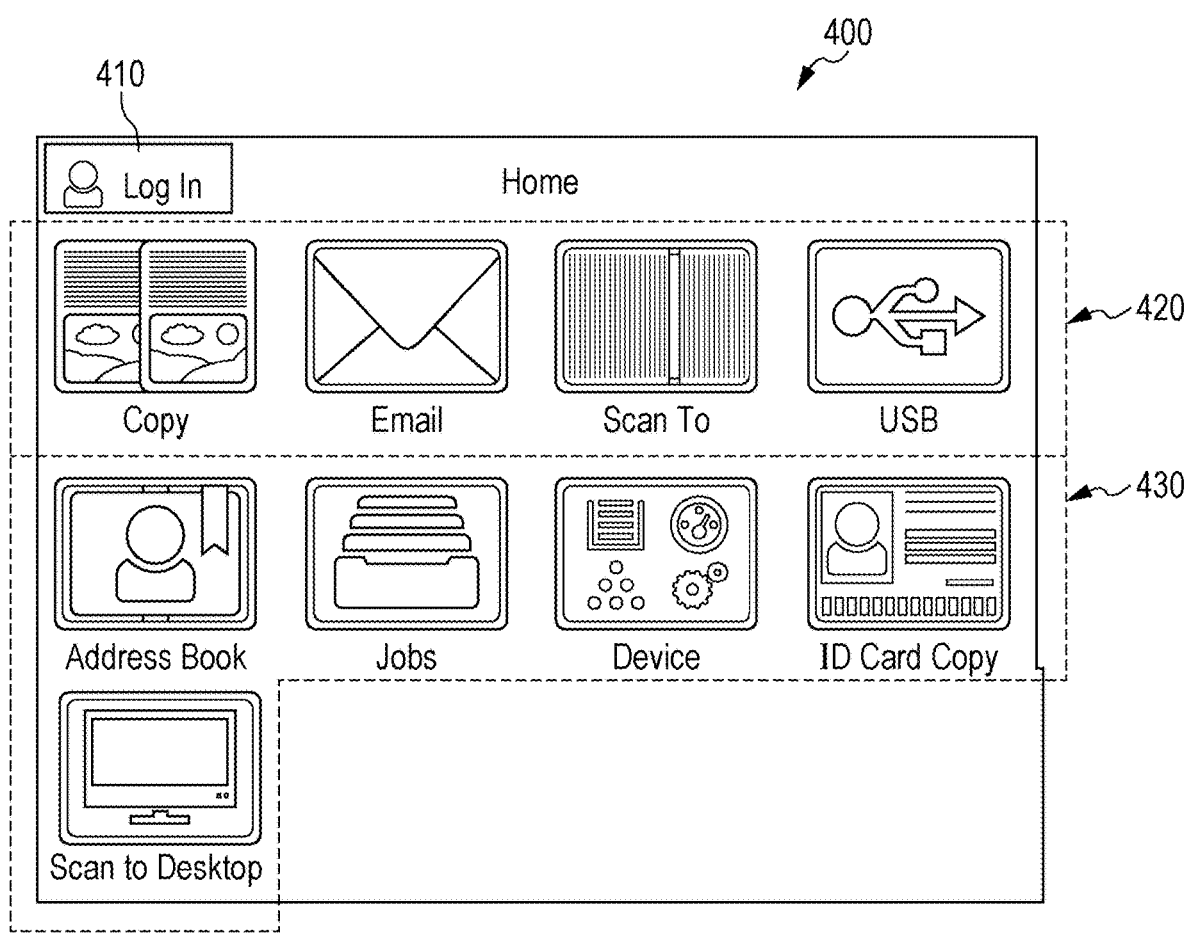
FIG. 4 is a view for explaining an example of processing executed in the exemplary embodiment.

FIG. 4 is a view for explaining an example of processing executed in the exemplary embodiment. On a home screen 400, a login user name display region 410, a basic processing function set 420, and an added application set 430 are displayed. The basic processing function set 420 is a set of basic processing functions as applications.

The basic processing function set 420 includes "Copy (setting)", "Email (electronic mail)", "Scan to (scan transfer)", and "USB".

The added application set 430 includes "Address Book", "Jobs", "Device", "ID Card Copy", and "Scan to Desktop".

In this manner, the basic processing functions and added applications are displayed on the home screen 400 as application buttons. When a user selects one of the basic processing functions and added applications, a setting screen (application basic screen) for starting the selected one of the basic processing functions and added applications is opened, thereby enabling the user to start a job.

In an added-application creating mode, an application button is selected, and an added application for implementing a specific object is created by using a basic processing function (or by using an added application which has already been created) corresponding to the selected application button.

Figure 5:
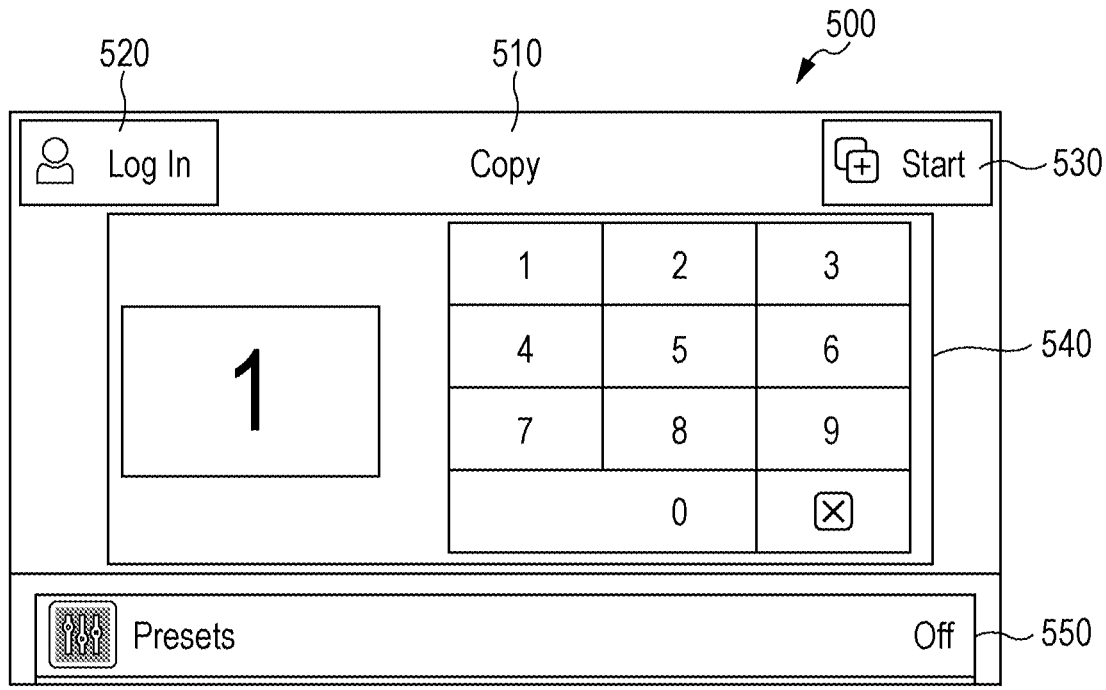
FIG. 5 is a view for explaining an example of processing executed in the exemplary embodiment.

An example of processing for creating, based on a basic processing function, an application by setting predetermined parameters for this basic processing function will be described below. FIG. 5 is a view for explaining an example of processing in the exemplary embodiment. More specifically, FIG. 5 illustrates processing for creating an added application by setting "1" for the copying function as the number of copies. On a screen 500, an application presenting field 510, a login button 520, a start button 530, a parameter setting (number of copies) field 540, and a parameter setting (other settings) field 550 are displayed. To set settings other than the number of copies, the parameter setting (other settings) field 550 is selected. In the example in FIG. 5, the user sets a parameter (sets "1" as the number of copies) on the screen 500.

Figure 6:
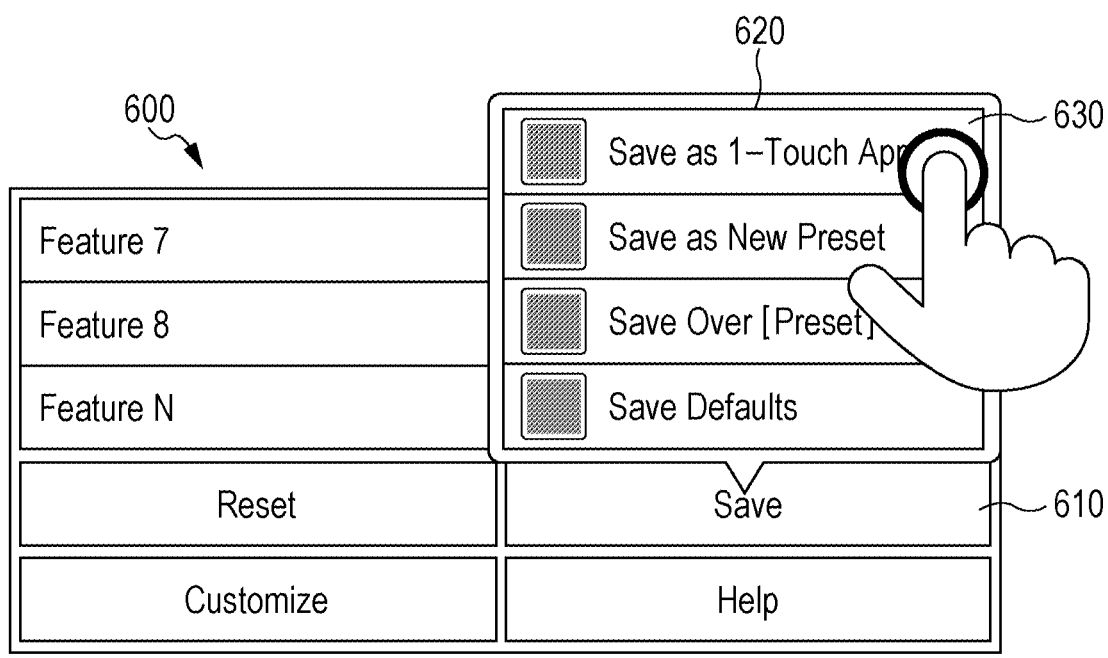
FIG. 6 is a view for explaining an example of processing executed in the exemplary embodiment.

FIG. 6 is a view for explaining an example of processing in the exemplary embodiment. On a screen 600, a save button 610, a save selection menu 620, and a "Save as 1-Touch App" button 630 are displayed. The screen 600 may be the bottom portion of the screen 500, in which case, the screen 600 may be displayed by scrolling the screen 500.

As a result of a user selecting the save button 610, the save selection menu 620 is displayed. The save selection menu 620 includes the "Save as 1-Touch App" button 630, a "Save as New Preset" button, a "Save Over [Preset]" button, and a "Save Defaults" button.

Then, as a result of the user selecting the "Save as 1-Touch App" button 630, the process proceeds to application name setting processing (step S304). An example of this processing is shown in FIG. 7.

In step S304, the name of the application is set.

Figure 7:
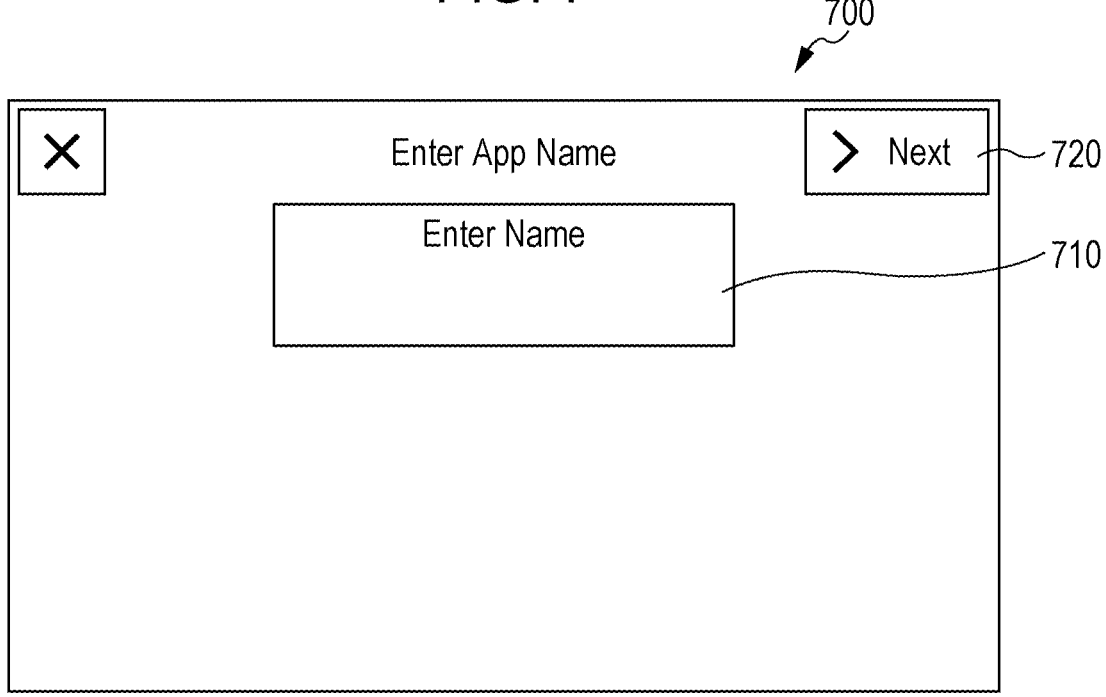
FIG. 7 is a view for explaining an example of processing executed in the exemplary embodiment.

FIG. 7 is a view for explaining an example of processing in the exemplary embodiment. On an application name setting screen 700, an application name setting region 710 and a "Next" button 720 are displayed. On the application name setting screen 700, "Enter App Name (setting of an application name)", for example, is displayed. The user is instructed to input the name of the application into the application name setting region 710.

The user inputs "Full copy", for example, into the application name setting region 710.

Then, as a result of the user selecting the "Next" button 720, the process proceeds to display mode setting processing (step S306). An example of this processing is shown in FIG. 8.

In step S306, the display mode (color set) for setting parameters and providing the state information concerning the application is set.

Figure 8:
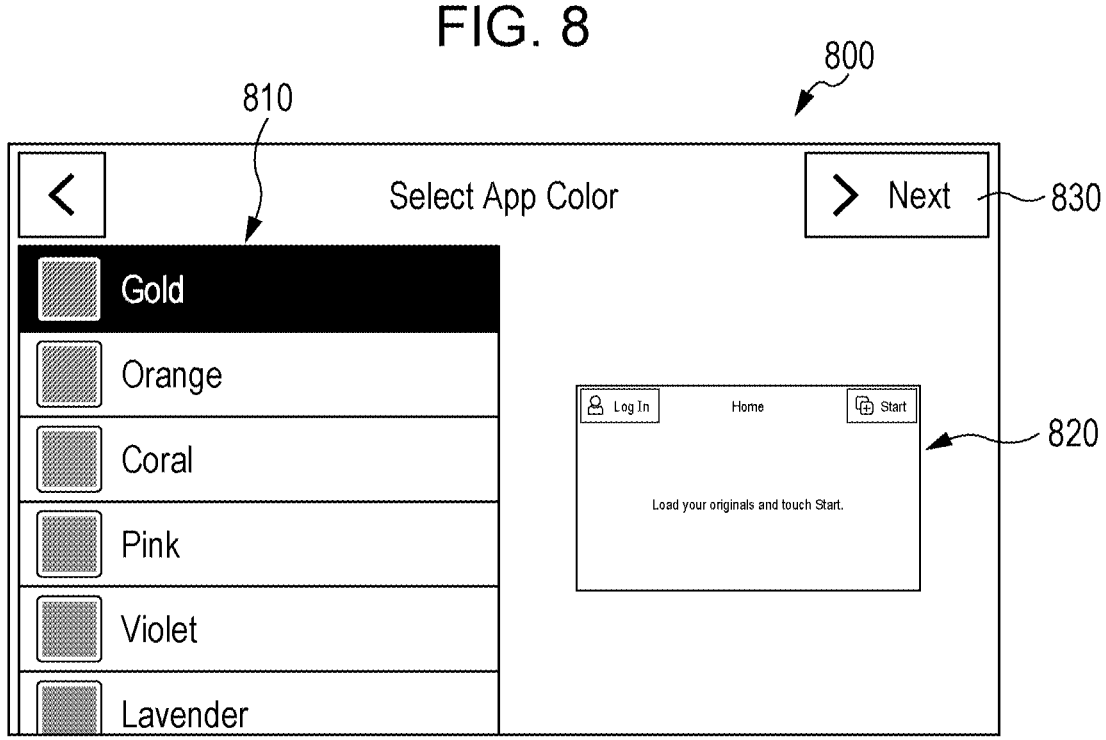
FIG. 8 is a view for explaining an example of processing executed in the exemplary embodiment.

FIG. 8 is a view for explaining an example of processing in the exemplary embodiment. On a display mode (color) setting screen 800, a color set selection menu 810, a preview region 820, and a "Next" button 830 are displayed. In the color set selection menu 810, buttons for selecting color sets (such as gold, orange, and coral) are displayed. The color set table 900 is read and the color sets indicated in the color set table 900 are displayed in the color set selection menu 810. Then, a reduced image of the display mode using the selected color set is displayed in the preview region 820. In this example, a reduced image of the display mode using gold is displayed.

Figure 10:
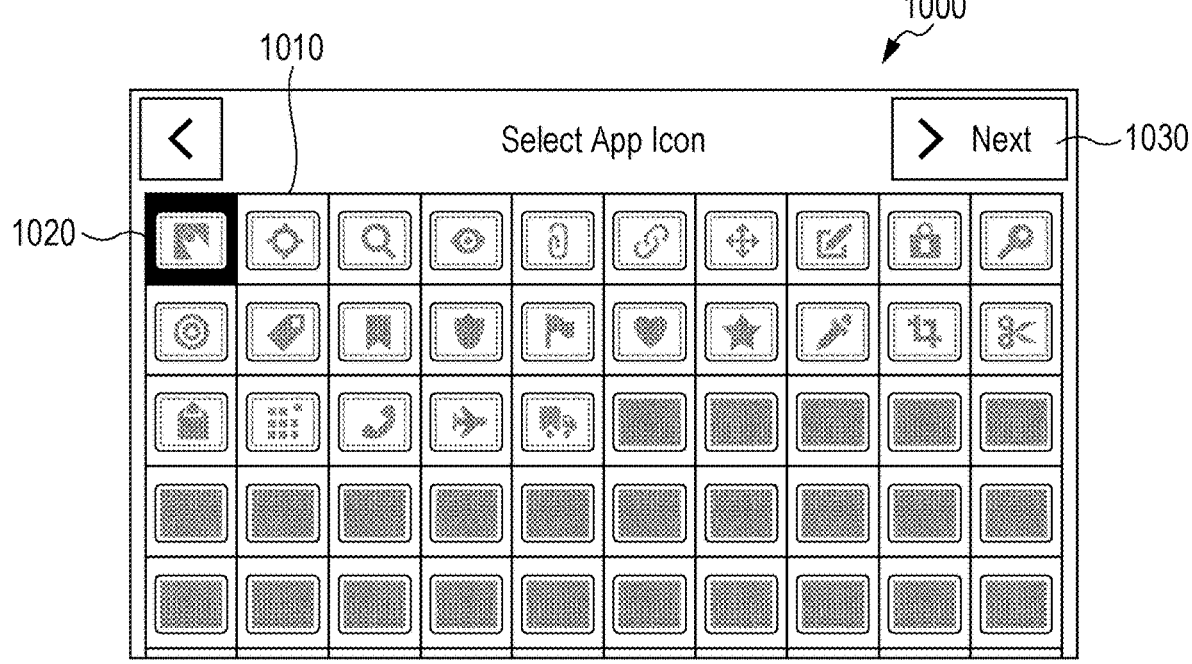
FIG. 10 is a view for explaining an example of processing executed in the exemplary embodiment.

Then, as a result of the user selecting the "Next" button 830, the process proceeds to icon setting processing (step S308). An example of this processing is shown in FIG. 10.

FIG. 9A illustrates an example of the data structure of the color set table 900.

Each application (including a basic processing function) has a color set which represents this application. The color set is also called a theme. The theme is a set of colors including a main color and some associated colors, such as a foreground color, a shade color, and a highlight color, which are determined by considering the balance with the main color and the visibility.

On an application basic screen, the theme of the application is presented to a user so that the main color of this application can stand out. The themes of the individual applications are presented to the user with some consistencies for all the applications. The main color is a dominant color in a color set and the other colors in the color set are derivative colors from the main color. For example, if the main color is red, the other colors are colors converted from red, such as deep red (dark red) and pale red (light red), so that the user can recall red from the other colors. The user recognizing a derivative color, such as dark red, can immediately recall the main color and understand that the main color is a color associated with the application. For example, if a color set including blue as the main color is used for a copying function, the user understands that blue represents an application for the copying function. If the main color is a deep color, a pale color, such as white, may be used as the character color by considering the visibility.

Icons of application buttons (see FIG. 4) for starting applications are also designed by using the main colors of themes.

The theme (the main color of the theme and an icon using the main color) of an application is a mode representing this application (the object of processing).

More specifically, the color set table 900 is used. FIG. 9A illustrates an example of the data structure of the color set table 900. By selecting a color set, the display mode can be determined.

The color set table 900 includes a color set ID field 905, an icon filed 910, and a color set field 915. The color set field 915 includes a main (single color) field 917, a main (texture pattern) field 919, a shade field 921, a highlight color field 923, and a character color field 925.

In the color set ID field 905, information (color set ID) for uniquely identifying a color set in the exemplary embodiment is stored. In the icon field 910, an icon using this color set is stored. In the color set field 915, the color set is stored. Five colors are defined in the color set field 915. Alternatively, a color set constituted by less than or more than five colors may be defined. In the main (single color) field 917, a first main color (single color), which is mainly a background color, is stored. In the main (texture pattern) field 919, a color having the first main color in the background with a texture pattern is stored as a second main color. In the shade field 921, the shade corresponding to the main color is stored. In the highlight color field 923, the highlight color corresponding to the main color is stored. In the character color field 925, the color of characters in the main color, and more specifically, the color of characters having the main color in the background, for example, is stored.

Figure 9B:
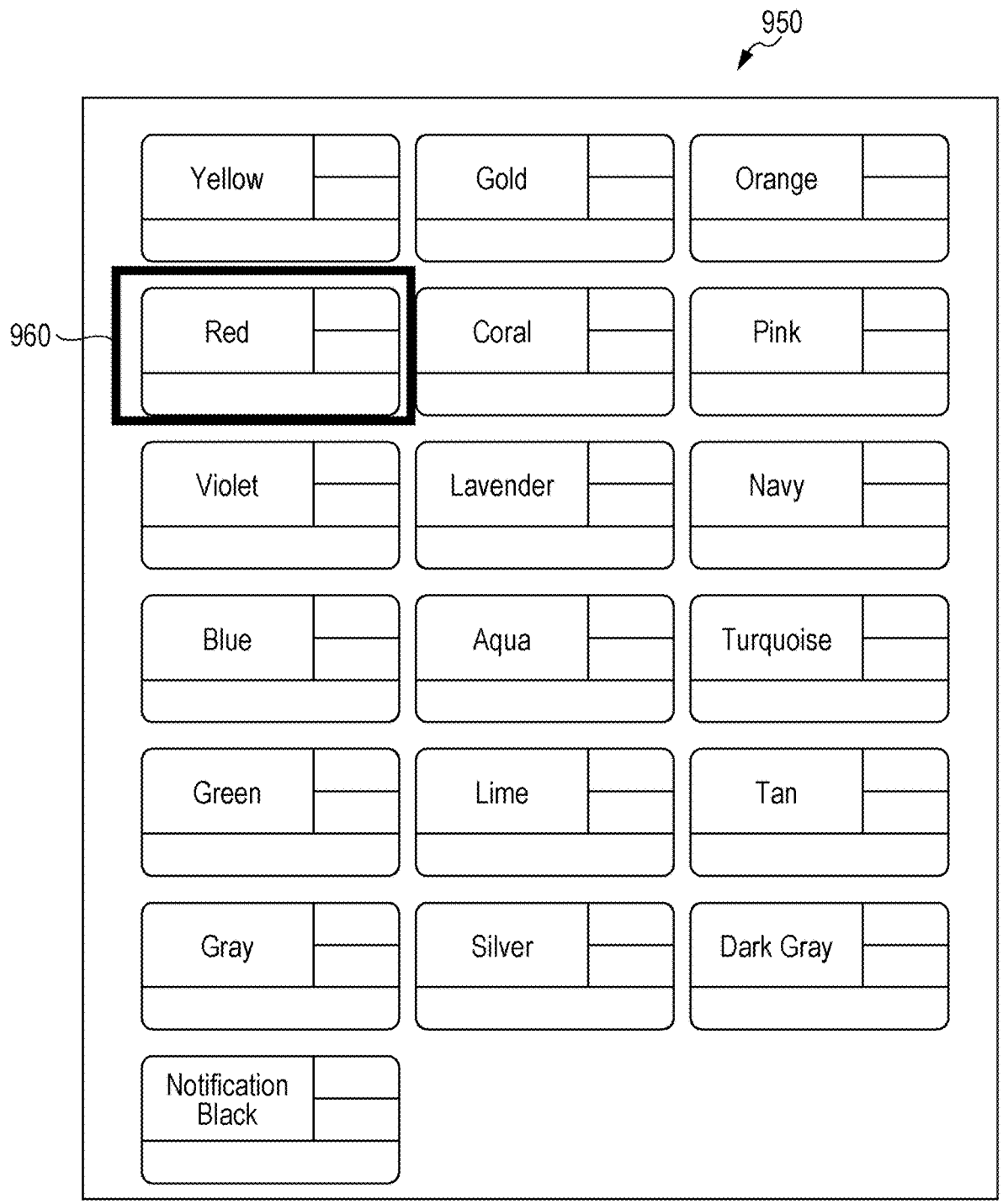
FIG. 9B illustrates an example of the relationship between a color palette and color sets.

FIG. 9B illustrates an example of the relationship between a color palette 950 and color sets 960. The color palette 950 is constituted by multiple color sets 960. Examples of the color sets 960 are a color set having yellow as the main color, a color set having gold as the main color, a color set having orange as the main color, and a color set having red as the main color. As color sets that a user is not allowed to select, the color sets of yellow, red, dark gray, and black are reserved as first informing modes in advance, while, as color sets that a user is allowed to select, color sets other than the color sets reserved as the first informing modes can be selected as second informing modes and other modes.

As the color set selection menu 810 shown in FIG. 8, the color palette 950 may be displayed.

In step S308, an icon representing the application is set.

FIG. 10 is a view for explaining an example of processing in the exemplary embodiment. On a display mode (icon) setting screen 1000, an icon set 1010, an icon 1020, and a "Next" button 1030 are displayed.

Within the icon set 1010, preset icons such as the icon 1020 are displayed so that the user can select one of them. The color of these icons is displayed by using the color set determined in step S306, for example, in gold. The user selects the icon 1020, for example, as the icon of the application.

Then, as a result of the user selecting the "Next" button 1030, the process proceeds to operation setting processing (step S310). An example of this processing is shown in FIG. 11.

In step S310, the operation setting screen for the application is set. More specifically, an attribute for displaying operation settings for the application is set.

Figure 11:
FIG. 11 is a view for explaining an example of processing executed in the exemplary embodiment.

FIG. 11 is a view for explaining an example of processing in the exemplary embodiment. On an operation setting screen 1100, a "Review Before Start" button 1110, a "Start Immediately" button 1120, and a "Next" button 1130 are displayed.

The user selects the "Review Before Start" button 1110, which means that set parameters will be reviewed before starting processing, for example, as an operation attribute for the application.

Then, as a result of the user selecting the "Next" button 1130, the process proceeds to guide message setting processing. An example of this processing is shown in FIG. 12.

Figure 12:
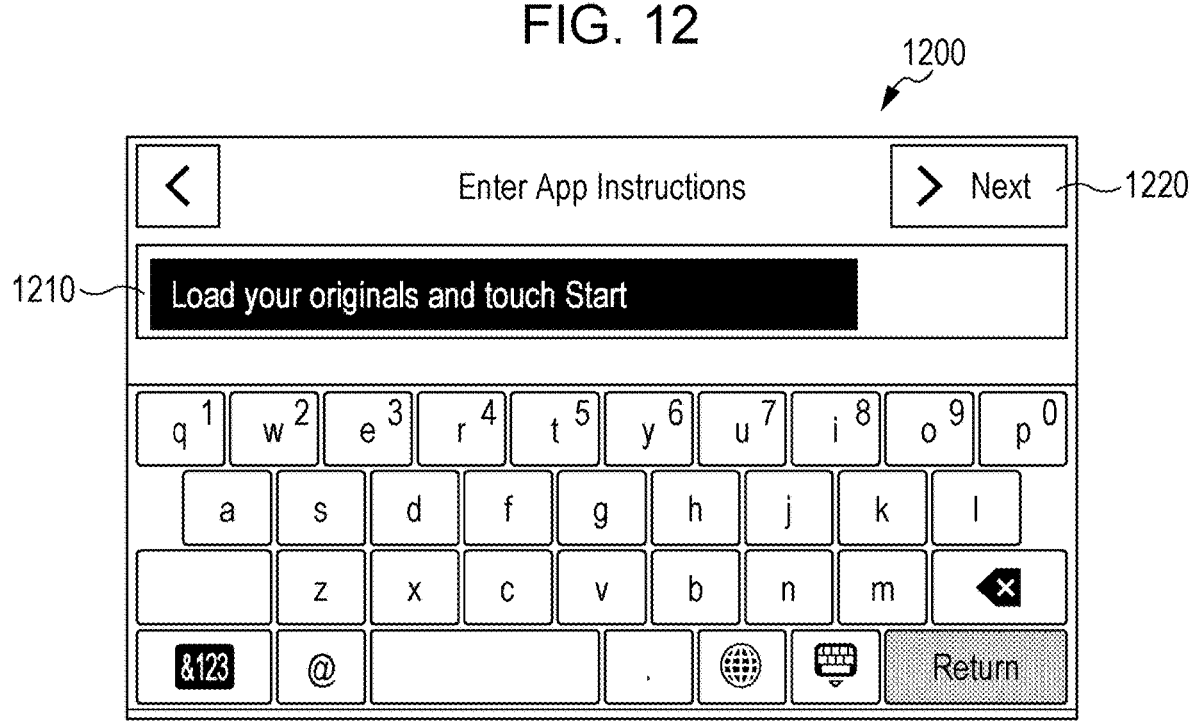
FIG. 12 is a view for explaining an example of processing executed in the exemplary embodiment.

FIG. 12 is a view for explaining an example of processing in the exemplary embodiment. On a guide message setting screen 1200, a guide message input field 1210 and a "Next" button 1220 are displayed.

In the guide message input field 1210, the user inputs "Load your originals and touch Start", for example, as a guide message.

Then, as a result of the user selecting the "Next" button 1220, the process proceeds to display setting processing. An example of this processing is shown in FIG. 13.

Figure 13:
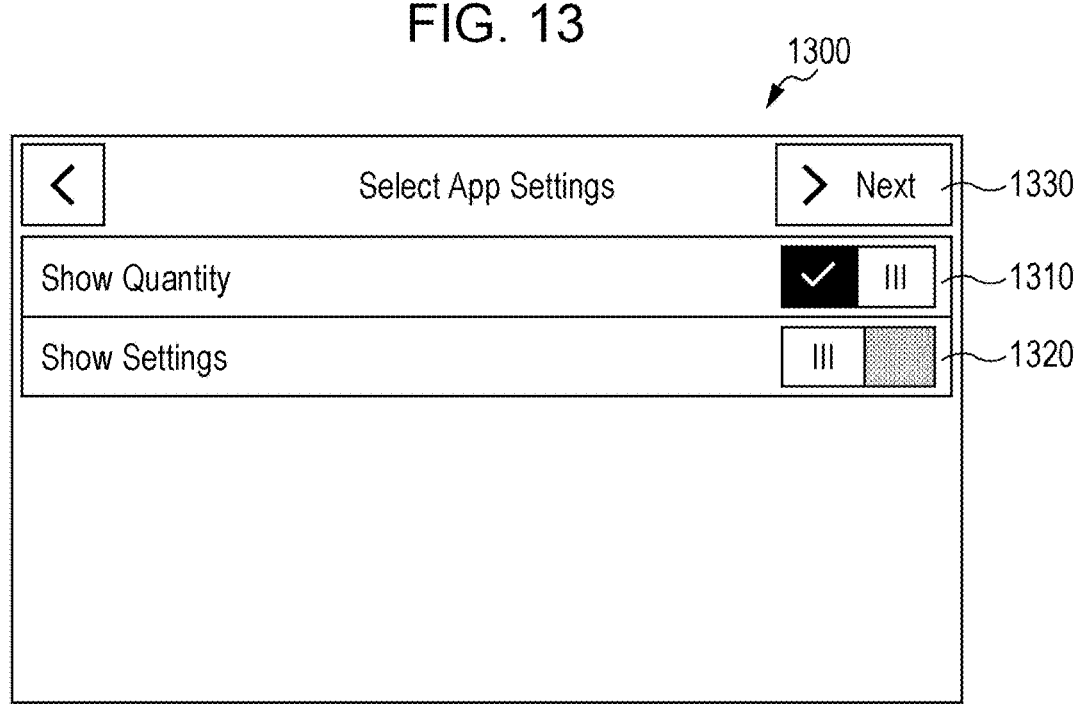
FIG. 13 is a view for explaining an example of processing executed in the exemplary embodiment.

FIG. 13 is a view for explaining an example of processing in the exemplary embodiment. On a display setting screen 1300, a "Show Quantity" button 1310, a "Show Settings" button 1320, and a "Next" button 1330 are displayed.

The user selects, for example, the "Show Quantity" button 1310, which means that the number of copies will be displayed, as display settings.

Then, as a result of the user selecting the "Next" button 1330, the process proceeds to sharing setting processing (step S312). An example of this processing is shown in FIG. 14.

In step S312, a setting for whether the application will be for a private use (user only) or for a public use (sharing with other users) is set. That is, a setting for whether to restrict users to start this application or to share this application with other users is set.

Figure 14:
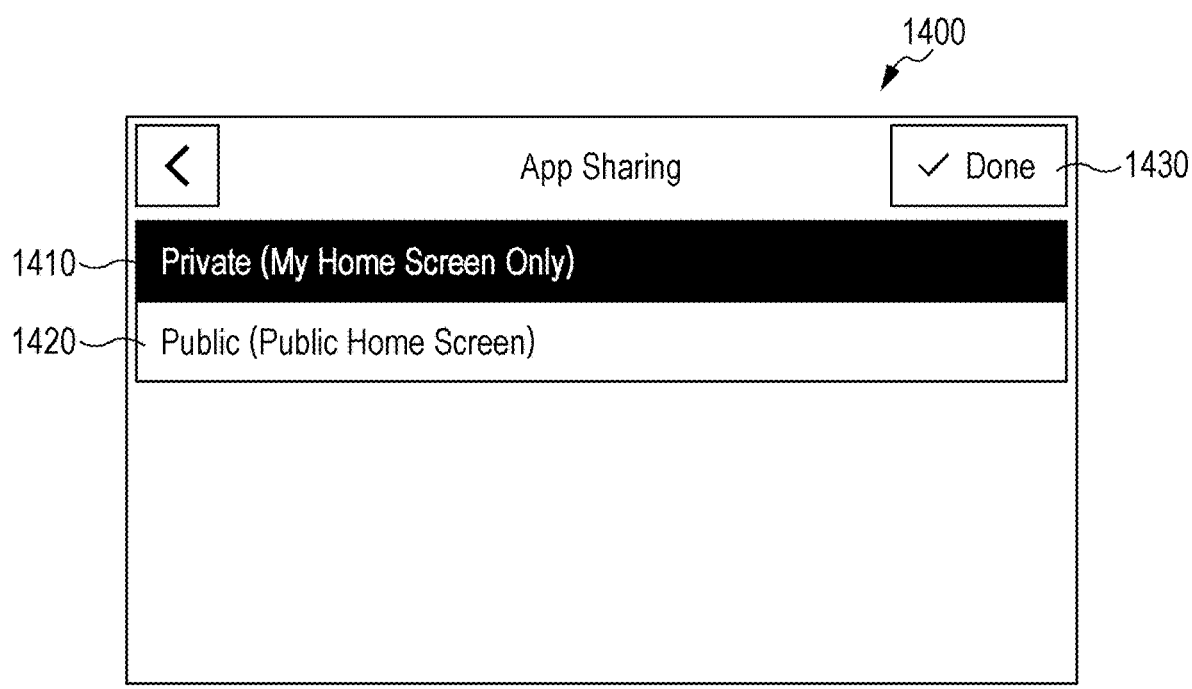
FIG. 14 is a view for explaining an example of processing executed in the exemplary embodiment.

FIG. 14 is a view for explaining an example of processing in the exemplary embodiment. On a sharing setting screen 1400, a "Private (My Home Screen Only)" button 1410, a "Public (Public Home Screen)" button 1420, and a "Done" button 1430 are displayed.

The user selects, for example, the "Private (My Home Screen Only)" button 1410, which means that the application is for a private use (only for this user).

Figure 15:
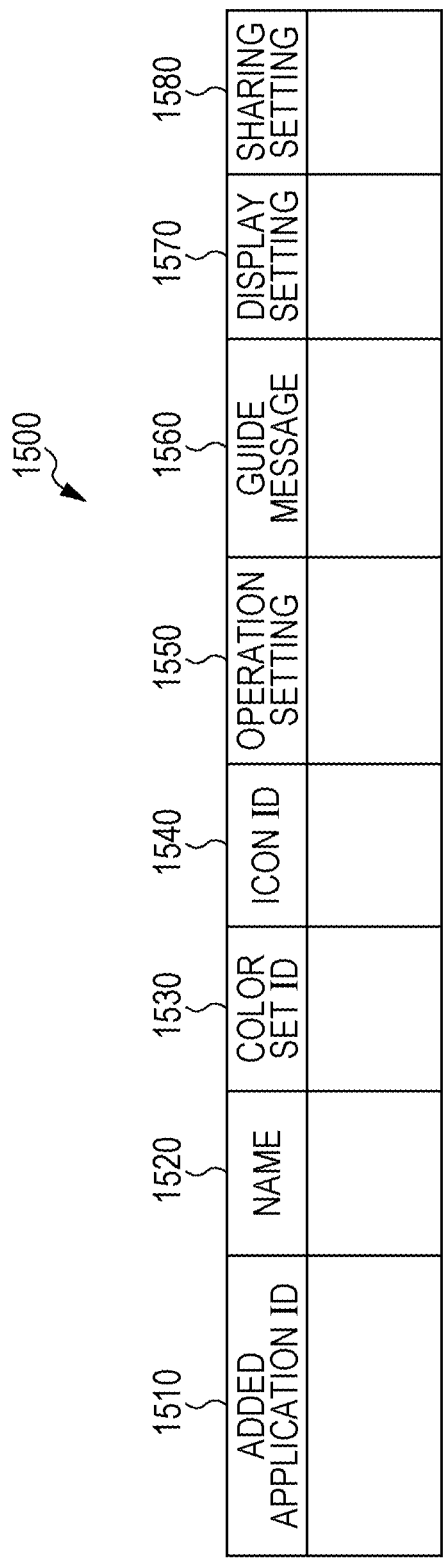
FIG. 15 illustrates an example of the data structure of an added-application information table.

Then, as a result of the user selecting the "Done" button 1430, the process proceeds to application setting processing (step S314). An example of this processing is shown in FIG. 15.

In step S314, the application is set. For example, an added-application information table 1500 for storing items of information concerning the application set by the setting processing in steps S304 through S312 is generated. FIG. 15 illustrates an example of the data structure of the added-application information table 1500. The added-application information table 1500 includes an added application ID field 1510, a name field 1520, a color set ID field 1530, an icon ID field 1540, an operation setting field 1550, a guide message field 1560, a display setting field 1570, and a sharing setting field 1580. In the added application ID field 1510, information (added application ID) for uniquely identifying an added application in the exemplary embodiment is stored. In the name field 1520, the name which is set in step S304 is stored. In the color set ID field 1530, information (color set ID) for uniquely identifying the color set which is set in step S306 is stored. In the icon ID field 1540, information (icon ID) for uniquely identifying the icon set which is set in step S308 is stored. In the operation setting field 1550, the operation setting (see FIG. 11) set in step S310 is set. In the guide message field 1560, the guide message (see FIG. 12) set in step S310 is stored. In the display setting field 1570, the display setting (see FIG. 13) set in step S310 is stored. In the sharing setting field 1580, the sharing setting which is set in step S312 is stored.

In step S316, the icon of the application is displayed on the home screen.

Figure 16:
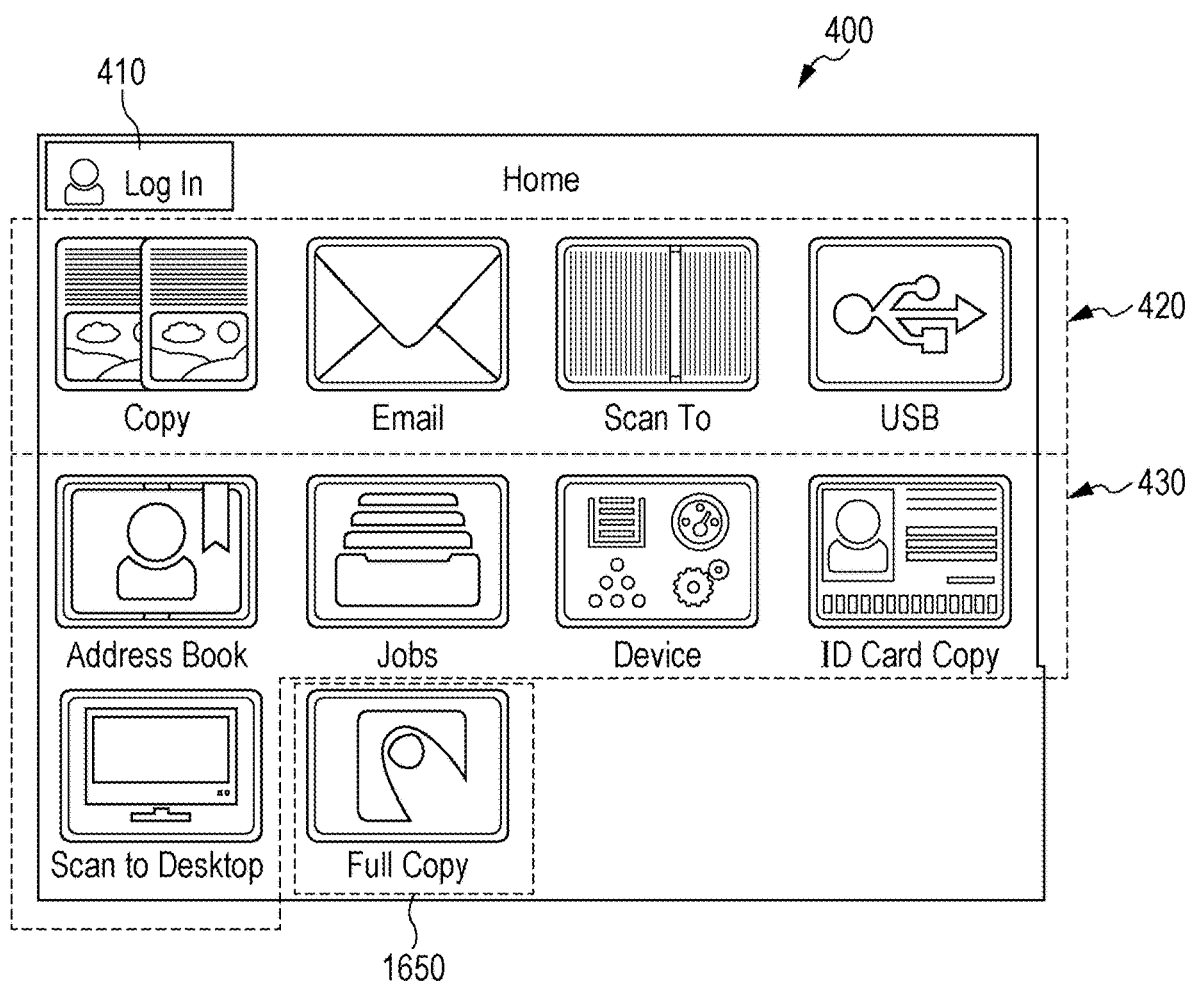
FIG. 16 is a view for explaining an example of processing executed in the exemplary embodiment.

FIG. 16 is a view for explaining an example of processing in the exemplary embodiment. On a home screen 400, a login user name display region 410, a basic processing function set 420, an added application set 430, and a "full copy" icon 1650 are displayed. That is, the "full copy" icon 1650, which is a new added application, is added at the end of the added application set 430 on the home screen 400 shown in FIG. 4. The color of the "full copy" icon 1650 is a color selected on the display mode (color) setting screen 800.

Figure 17:
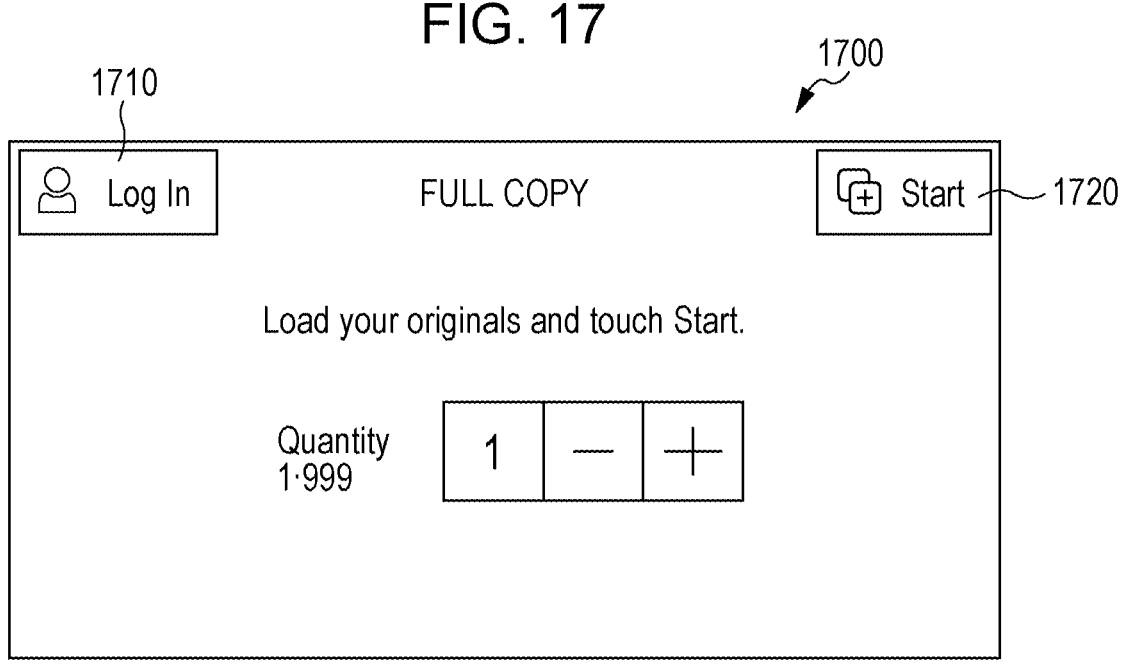
FIG. 17 is a view for explaining an example of processing executed in the exemplary embodiment.

As a result of the user selecting the "full copy" icon 1650, a screen shown in FIG. 17, for example, is displayed. FIG. 17 is a view for explaining an example of processing in the exemplary embodiment. On an application (full copy) screen 1700, a "Log in" button 1710 and a "Start" button 1720 are displayed.

On the application (full copy) screen 1700, the guide message set on guide message setting screen 1200 and the content set on the display setting screen 1300 are displayed. The colors in the application (full copy) screen 1700 are the colors set in the display mode (color) setting screen 800. That is, the colors (such as the character color and background color) of the selected color set are used.

On an application creating screen for creating an added application according to the processing in the flowchart of FIG. 3, the unique color set and the unique icon for this added application can be set on the display mode (color) setting screen 800 and the display mode (icon) setting screen 1000, respectively.

On the display mode (color) setting screen 800, the color set used for setting an added application can be selected. In this case, control may be performed in the following manner not to let the user select a special color set reserved by the system (information processing device 100 and the image processing apparatus 200).

The color set "dark gray", which is used by applications related to system control, and similar color sets are not displayed as selection options.

"Red" and "black with a transparent background" are used when issuing a warning or providing state information to a user, and "red", "black" and similar color sets are not displayed as selection options.

"Yellow", which is used for the execution of screen customizing, and similar color sets are not displayed as selection options.

In the selection candidate storage module 125, plural color sets (including background colors, character colors, highlight colors, and shade colors determined by considering the visibility) are stored. The user is able to select one of the color sets to be used for an added application on the display mode (color) setting screen 800. As described above, yellow, red, dark gray, and black are reserved for the system and are not displayed as selection options.

Instead of creating an added application by the image processing apparatus 200 according to the flowchart in FIG. 3, an added application, such as a workflow, may be created by the user terminal 210 using an API provided by the image processing apparatus 200 and then installed in the image processing apparatus 200. Examples of such processing will be described below as the following processing examples (1) through (3).

Processing Example (1)

Concerning an added application created by an external device (such as a user terminal 210), the user is not allowed to determine a color used for the application as desired, and instead, the user specifies a color set by using an API provided by the image processing apparatus 200. In this case, the user is allowed to select one of the preset color sets. The colors reserved by the image processing apparatus 200 are not provided as selection options.

Processing Example (2)

When an added application created by an external device is installed, the added application is analyzed.

Processing Example (2-1)

Figure 18:
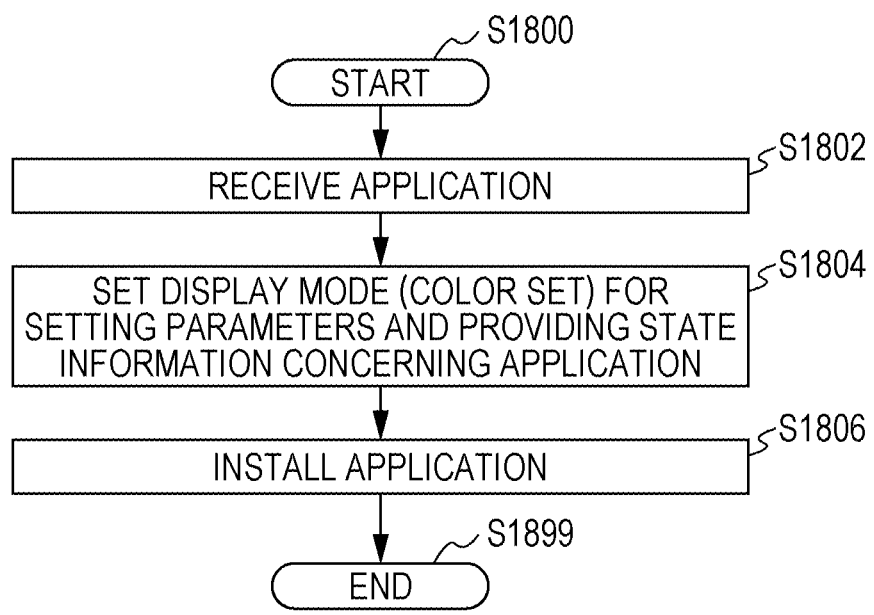
FIG. 18 is a flowchart illustrating an example of processing executed in the exemplary embodiment.

Processing shown in FIG. 18 is executed. FIG. 18 is a flowchart illustrating an example of processing executed in the exemplary embodiment.

In step S1802, an application is received.

In step S1804, the display mode (color set) for setting parameters and providing state information concerning the application is set. This application has been programmed so that the selected color set can be changed. In other words, the application is not executed by the image processing apparatus 200 unless step S1804 is executed. In step S1804, processing similar to step S306 is executed to set a color set.

In step S1806, the application is installed.

Processing Example (2-2)

Processing shown in FIG. 19 is executed. FIG. 19 is a flowchart illustrating an example of processing executed in the exemplary embodiment.

In step S1902, an application is received.

In step S1904, virtual execution of the application is conducted.

It is determined in step S1906 whether the application has a predetermined display mode. If the application has a predetermined display mode, the process proceeds to step S1908. If the application does not have a predetermined display mode, the process proceeds to step S1910.

In step S1908, information that it is not possible to install the application is displayed.

In step S1910, the application is installed.

When installing an additional application, the image processing apparatus 200 conducts virtual execution of this application. Then, if a predetermined display mode (pattern), which will be discussed below, is found on the screen, the image processing apparatus 200 does not permit the installation of this application. "Virtual execution" refers to performing drawing in a memory space which is not associated with a display, but it appears to an added application as if drawing were performed on the display. Although drawing on the display is not actually performed, colors used for drawing can be found by extracting the drawing colors in the memory space.

Figure 20A:
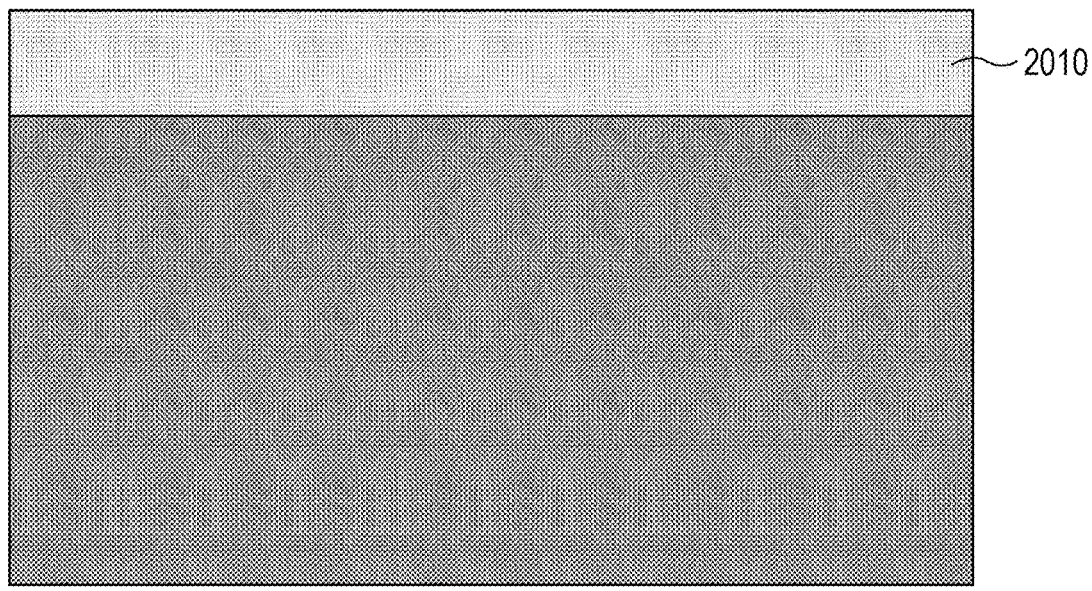
FIGS. 20A through 20C are views for explaining examples of processing executed in the exemplary embodiment.
Figure 20B:
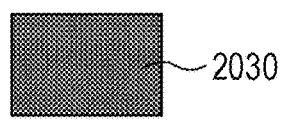
Figure 20C:
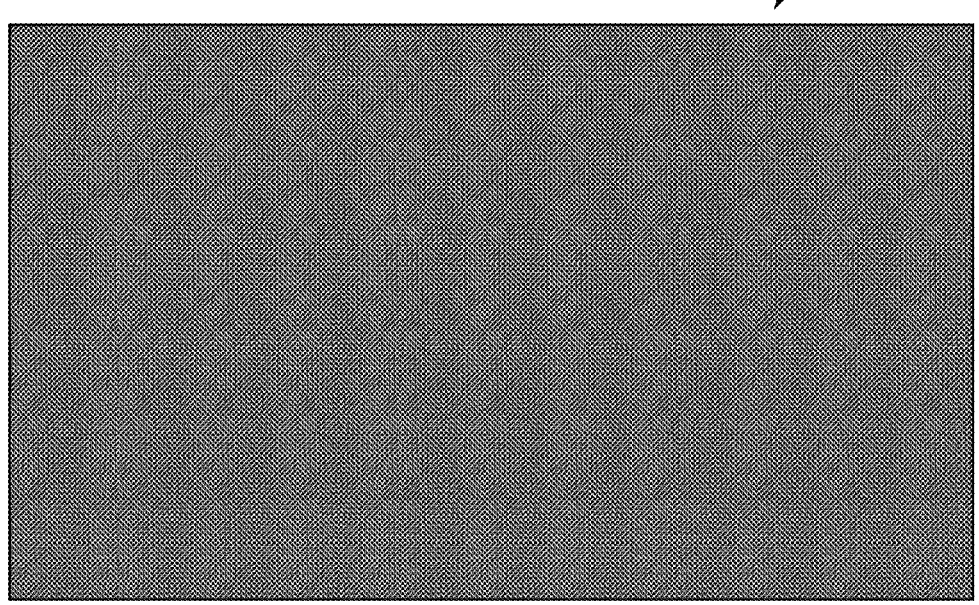

Examples of the predetermined display mode (pattern) are patterns illustrated in FIGS. 20A through 20C. If one of these patterns is found, the result of step S1906 becomes Yes. The pattern illustrated in FIG. 20A shows conditions that at an upper portion which occupies A (⅓, for example) or greater of a screen 2000, a subject region 2010 having a vertical length of B (ten pixels, for example) or greater and a horizontal length of C (½, for example) or greater of the screen 2000, and a pixel value of D (from #ffff00 in hexadecimal notation to 10/255 in composite pixels) is located. The pattern illustrated in FIG. 20B shows conditions that a rectangular subject region 2030 having a vertical length of E (fifteen pixels, for example) or greater, a horizontal length of F (fifteen pixels, for example) or greater, and a pixel value of G (from #ff0000 in hexadecimal notation to 20/255 in composite pixels) is located at a certain position of the screen. The pattern illustrated in FIG. 20C shows conditions that a subject region 2050 occupies H (80% or higher, for example) of the screen and the lightness of the subject region 2050 is less than I (30, for example).

Processing Example (2-3)

Processing shown in FIG. 21 is executed. FIG. 21 is a flowchart illustrating an example of processing executed in the exemplary embodiment.

In step S2102, an application is received.

In step S2104, virtual execution of the application is conducted.

It is determined in step S2106 whether the application has a predetermined display mode. If the application has a predetermined display mode, the process proceeds to step S2108. If the application does not have a predetermined display mode, the process proceeds to step S2110.

In step S2108, filter processing for changing the drawing color is incorporated into the application.

In step S2110, the application is installed.

In this processing example, by replacing step S1908 in FIG. 19 by step S2108 in FIG. 21, the color is changed so that the application can be installed. As the filter processing in step S2108, the color of the subject region is changed in the following manner. In the example in FIG. 20A, the lightness of the pixel value is reduced to J (80%, for example) or the hue is converted (into #5fff00, for example, in hexadecimal notation). In the example in FIG. 20B, the lightness of the pixel value is reduced to K (80%, for example), or the hue is converted (into #ff00ff, for example, in hexadecimal notation). In the example in FIG. 20C, the lightness of the pixel value is raised to L (50%, for example).

Processing Example (3)

When an installed added application is executed, if a predetermined display mode (pattern) is found within a screen, filter processing for changing the drawing color is executed on the region having the predetermined display mode. More specifically, steps S2106 and S2108 in FIG. 21 are executed when executing an added application.

Figure 22:
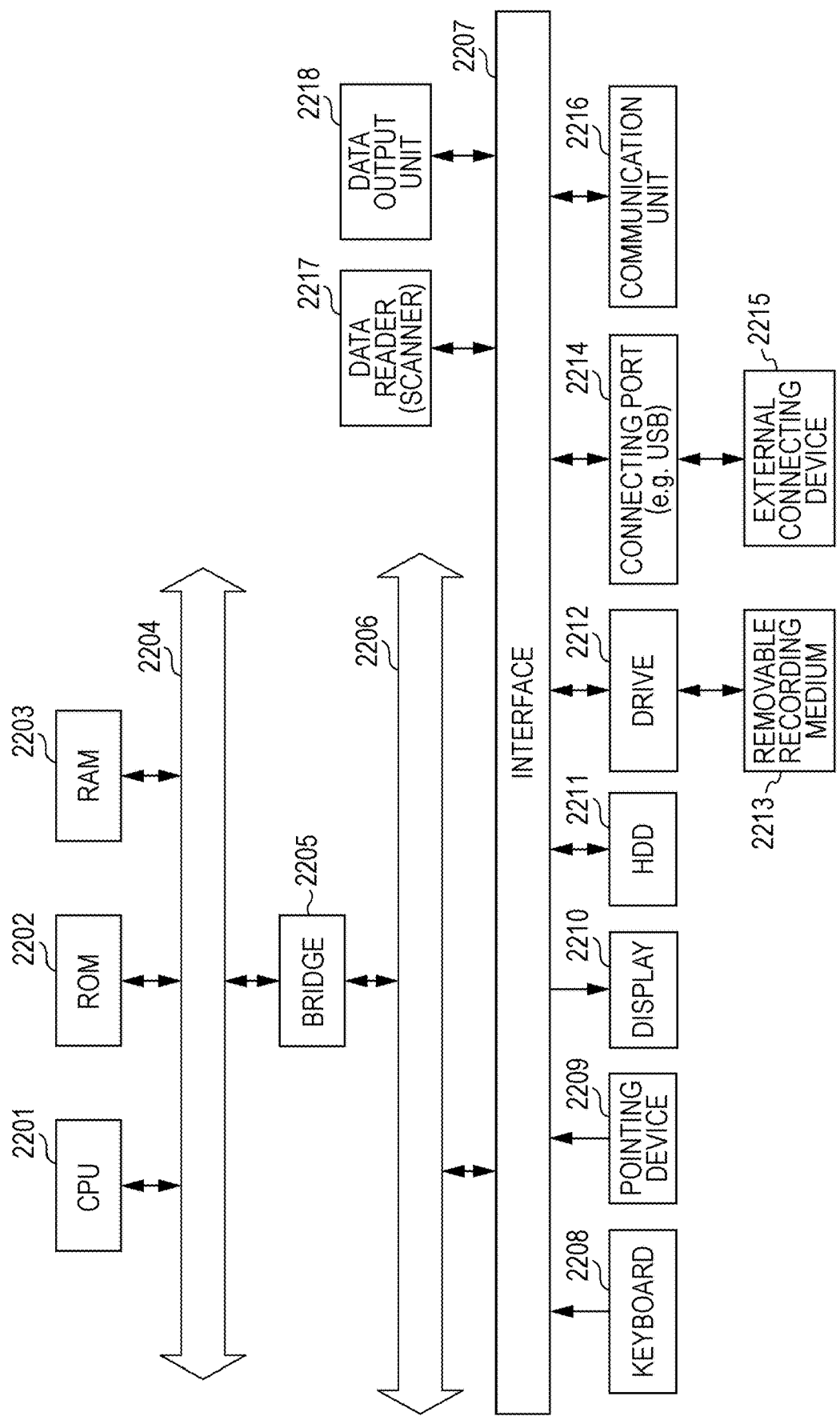
FIG. 22 is a block diagram illustrating an example of the hardware configuration of a computer implementing the exemplary embodiment.

An example of the hardware configuration of the information processing device 100 of this exemplary embodiment will be described below with reference to FIG. 22. The hardware configuration shown in FIG. 22 is implemented as a personal computer (PC), for example, and includes a data reader 2217, such as a scanner, and a data output unit 2218, such as a printer.

A CPU 2201 is a control unit that executes processing in accordance with a computer program describing an execution sequence of the modules of the above-described exemplary embodiment, that is, the application module 110, the basic processing function module 115, the setting module 120, the user interface module 130, the parameter setting module 135, and the state informing module 140.

A read only memory (ROM) 2202 stores programs and operation parameters used by the CPU 2201. A RAM 2203 stores programs used during the execution of the CPU 2201 and parameters which change appropriately during the execution of the programs. The CPU 2201, the ROM 2202, and the RAM 2203 are connected to one another via a host bus 2204, which is constituted by, for example, a CPU bus.

The host bus 2204 is connected to an external bus 2206, such as a peripheral component interconnect/interface (PCI) bus, via a bridge 2205.

A keyboard 2208 and a pointing device 2209, such as a mouse, are devices operated by an operator. A display 2210 is, for example, a liquid crystal display or a cathode ray tube (CRT), and displays various items of information as text or image information. Alternatively, a touch screen having both of the functions of the pointing device 2209 and the display 2210 may be provided. In this case, unlike the keyboard 2208, the keyboard of the touch screen may not a physical keyboard, and a keyboard drawn on a screen (touch screen) by using software, that is, a so-called software keyboard or screen keyboard, may be used.

A hard disk drive (HDD) 2211 has a built-in hard disk (may alternatively be a flash memory, for example) and drives the hard disk so as to record or play back information or programs executed by the CPU 2201. The hard disk implements functions such as the selection candidate storage module 125. Various other items of data and various other computer programs are also stored in the hard disk.

A drive 2212 reads data or a program recorded in a removable recording medium 2213, such as a magnetic disk, an optical disc, a magneto-optical disk, or a semiconductor memory, and supplies the read data or program to the RAM 2203 via an interface 2207, the external bus 2206, the bridge 2205, and the host bus 2204. The removable recording medium 2213 is also usable as a data recording region.

A connecting port 2214 is a port for connecting the PC to an external connecting device 2215, and has a connecting portion, such as a USB port or an IEEE1394 port. The connecting port 2214 is connected to, for example, the CPU 2201, via the interface 2207, the external bus 2206, the bridge 2205, and the host bus 2204. A communication unit 2216 is connected to a communication line and executes data communication processing with an external source. The data reader 2217 is, for example, a scanner, and executes processing for reading documents. The data output unit 2218 is, for example, a printer, and executes processing for outputting document data.

The hardware configuration of the information processing device shown in FIG. 22 is only an example, and the information processing device may be configured in any manner in which the modules described in the exemplary embodiment are executable. For example, some modules may be configured as dedicated hardware (for example, an application specific integrated circuit (ASIC)), or some modules may be installed in an external system and be connected to the information processing device 100 via a communication line. Alternatively, a system, such as that shown in FIG. 22, may be connected to a system, such as that shown in FIG. 22, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device.

The above-described program may be stored in a recording medium and be provided. The program recorded on a recording medium may be provided via a communication medium. In this case, the above-described program may be implemented as a "non-transitory computer readable medium storing the program therein" in the exemplary embodiment of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray(registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted in a manner such that it can be reconstructed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a processor programmed to:
        create an application for implementing a specific object by using at least one basic processing function;
        present a plurality of color themes as being available for the application, with the proviso that a color theme used for a setting screen or a checking screen for an existing application of the information processing device that implements a basic processing function is not presented as being available for the application being created; and
        receive an input to select one of the plurality of color themes for the application being created, the selected color theme determining a display color of a setting screen or a checking screen for the application being created, the setting screen being a screen to set a parameter for the application being created, the checking screen being a screen to check a processing state of the application being created.

2. The information processing device according to claim 1, wherein the processor is programmed to:
    present a plurality of selection candidates when determining the display color of the setting screen or the checking screen for the application being created.

3. The information processing device according to claim 2, wherein the processor is programmed to:
    select certain selection candidates from the plurality of selection candidates based on the selected color theme for the application being created;
    based on the selection of the certain selection candidates, restrict information presented as being available for the display color of the checking screen for the application being created; and
    receive an input selecting the display color of the checking screen for the application being created among the certain selection candidates.

4. The information processing device according to claim 2, wherein the processor is programmed to:
    based on the selection of the certain selection candidates, restrict information presented as being available for the display color of the setting screen for the application being created; and
    receive an input selecting the display color of the setting screen for the application being created among the certain selection candidates.

5. The information processing device according to claim 3, wherein the processor is programmed to:
    select certain selection candidates from the plurality of selection candidates based on the selected color theme for the application being created;
    based on the selection of the certain selection candidates, restrict information presented as being available for the display color of the setting screen for the application being created; and
    receive an input selecting the display color of the setting screen for the application being created among the certain selection candidates.

6. The information processing device according to claim 1, comprising:
    a display that displays the setting screen or the checking screen for the application being created.

7. The information processing device according to claim 1, wherein
    each color theme is a color set constituted by a plurality of colors having a common theme.

8. The information processing device according to claim 7, wherein
    the plurality of colors in each color theme defines at least one of a character color and a background color.

9. The information processing device according to claim 1, wherein the processor is programmed to:
    after the color theme is selected for the application being created, display a plurality of icons in a color set according to the selected color theme; and
    receive an input to select one of the plurality of icons to be associated with the application being created.

10. The information processing device according to claim 1, wherein when presenting the plurality of color themes as being available for the application being created, the color theme used for the setting screen or the checking screen for the existing application that implements the basic processing function is not displayed.

11. The information processing device according to claim 1, wherein when presenting the plurality of color themes as being available for the application being created, the color theme used for the setting screen or the checking screen for the existing application that implements the basic processing function is displayed but is not available for selection.

12. A non-transitory computer readable medium storing a program causing a computer to execute a process, the process comprising:

creating an application for implementing a specific object by using at least one basic processing function;

presenting a plurality of color themes as being available for the application, with the proviso that a color theme used for a setting screen or a checking screen for an existing application of the information processing device that implements a basic processing function is not presented as being available for the application being created; and receiving an input to select one of the plurality of color themes for the application being created, the selected color theme determining a display color of a setting screen or a checking screen for the application being created, the setting screen being a screen to set a parameter for the application being created, the checking screen being a screen to check a processing state of the application being created.

* * * * *